US 6,748,799 B2

(12) United States Patent
Fischer et al.

(10) Patent No.: US 6,748,799 B2
(45) Date of Patent: Jun. 15, 2004

(54) METHOD AND SYSTEM FOR MONITORING A TIRE AIR PRESSURE USING A COUNTER

(75) Inventors: Frank Fischer, Linkenheim Hochstetten (DE); Dominik Fuessel, Dietzenbach (DE); Martin Prenninger, Regensburg (DE); Martin Fischer, Regensburg (DE); Franz Hillenmayer, Burglengenfeld (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/238,234

(22) Filed: Sep. 10, 2002

(65) Prior Publication Data
US 2003/0079536 A1 May 1, 2003

(30) Foreign Application Priority Data
Sep. 10, 2001 (DE) .......................... 101 44 326

(51) Int. Cl.⁷ .................... G01M 17/02; B60C 23/02
(52) U.S. Cl. .......................... 73/146.5; 73/146
(58) Field of Search ................. 340/442, 443, 340/444, 445, 446, 447; 73/146, 146.2, 146.3, 146.5

(56) References Cited
U.S. PATENT DOCUMENTS

| 4,186,377 | A | * | 1/1980 | Barabino | 340/446 |
| 5,569,848 | A | * | 10/1996 | Sharp | 73/146.2 |
| 5,585,554 | A | * | 12/1996 | Handfield et al. | 73/146.5 |
| 5,717,135 | A | * | 2/1998 | Fiorletta et al. | 73/146.5 |
| 5,895,846 | A | | 4/1999 | Chamussy et al. | |
| 6,043,737 | A | * | 3/2000 | Shehan et al. | 340/442 |
| 6,275,148 | B1 | * | 8/2001 | Takamura et al. | 340/442 |
| 6,278,363 | B1 | * | 8/2001 | Bezek et al. | 340/442 |
| 6,408,690 | B1 | * | 6/2002 | Young et al. | 73/146.5 |
| 6,448,891 | B2 | * | 9/2002 | Barnett | 340/438 |
| 6,453,737 | B2 | * | 9/2002 | Young et al. | 73/146.5 |

FOREIGN PATENT DOCUMENTS

| DE | 4014379 A1 | 11/1991 | ........... B60C/23/00 |
| DE | 4224498 C1 | 1/1994 | ........... B60C/23/00 |
| DE | 4232240 A1 | 3/1994 | ........... B60C/23/00 |
| DE | 19522486 C2 | 4/1999 | ........... B60C/23/04 |
| EP | 0 221 522 | 10/1986 | ........... B60C/23/00 |

* cited by examiner

Primary Examiner—William Oen
(74) Attorney, Agent, or Firm—Baker Botts L.L.P.

(57) ABSTRACT

A method of monitoring a tire pressure, comprises the steps: measuring at least one parameter that influences the tire pressure, calculating the optimum tire pressure $p_{opt}$ on the basis of the at least one measured parameter, comparing a measured tire pressure p with the optimum tire pressure $p_{opt}$ in order to generate a deviation signal in the event of a predetermined deviation.

20 Claims, 2 Drawing Sheets

METHOD AND SYSTEM FOR MONITORING A TIRE AIR PRESSURE USING A COUNTER

CROSS REFERENCE TO RELATED APPLICATION

This application claims foreign priority benefits under 35 U.S.C. § 119 of German application DE 10144326.9 filed Sep. 10, 2001.

BACKGROUND OF THE INVENTION

The invention relates to a method and a system for monitoring a tire air pressure.

The air pressure in a tire is typically subjected to specific changes. These changes in the tire air pressure can be caused, for example, by various parameters such as the ambient air pressure around the tire. Likewise, the air pressure in a tire changes depending on whether the tire is used in warmer or colder areas.

U.S. Pat. No. 5,895,846 discloses a method of processing signals in a system for monitoring tires on a vehicle during its operation. In this case, only the tire pressure and the internal temperature of the tire but no further parameters that determine the air pressure in a tire are taken into account, so that a defect in the tire may mistakenly be detected.

SUMMARY OF THE INVENTION

The object of the invention is to provide a method and system for monitoring a tire air pressure, it being possible to determine reliably whether there is an optimum tire pressure in spite of the effect of various factors which determine the tire air pressure.

This object may be achieved by a method of monitoring a tire pressure, in which one or more parameters that influence the tire pressure are measured, and an optimum tire pressure is calculated, based on the measured parameter or parameters. In addition, a measured tire pressure may be compared with the optimum tire pressure, in order to generate a deviation signal in the event of a predetermined deviation. The predetermined deviation may be defined, for instance, by upper and lower limits. When the deviation signal exceeds the upper limit or falls below the lower limit, a deviation value may be increased. When no deviation signal is present the deviation value may be reduced. An alarm signal may be generated when the deviation value reaches a predetermined threshold value.

An example embodiment of a system for monitoring a tire pressure may include at least one tire to be monitored, as well as at least one sensor for measuring at least one parameter that influences the air pressure of the tire. The embodiment may also include an air pressure sensor for measuring a current tire air pressure, and an evaluation unit, which receives the parameter measured by the sensor and measured data from the air pressure sensor. The evaluation unit calculates an optimum tire pressure on the basis of the at least one measured parameter and compares the measured tire pressure with the optimum tire pressure in order to generate a deviation signal in the event of a predetermined deviation. The predetermined deviation is defined by an upper and lower limit. When the deviation signal generated exceeds the upper limit or falls below the lower limit, a deviation value is increased. The deviation value is reduced when no deviation signal is present. An alarm signal is generated when the deviation value reaches a predetermined threshold value.

Other advantageous developments of the invention may be appreciated upon a comprehensive review of this disclosure, including sections such as the Detailed Description and the Claims.

The influence of various parameters that influence the tire air pressure can be taken into account reliably during the monitoring of the air pressure in the tire.

In this case, a tolerance band is defined, within which a currently measured tire air pressure may deviate from an optimum tire air pressure without an alarm signal being generated.

According to one or more embodiments, it is possible to adapt the method to various vehicle types easily, since a vehicle-specific tire pressure, for example one specified by the vehicle manufacturer, is taken into account in monitoring the tire pressure.

According to one or more embodiments, various parameters that determine the tire air pressure are taken into account in monitoring an optimum tire air pressure. In this way, the optimum tire air pressure can be calculated at any time, even when external conditions change.

According to one or more embodiments, the tolerance band can be variable, by which means it can be adapted to various parameters that influence the tire air pressure. Thus, by using the method according to the invention, for example secure detection of a tire fault can be carried out, external influences being taken into account.

According to one or more embodiments, the driver of a vehicle which contains at least one tire whose tire air pressure is to be monitored is informed, for example, about a pressure drop in the monitored tire. This is done, for example, at a gas station, where there is the possibility for the driver to refill the tire with air.

According to one or more embodiments, the driver is informed about the still permissible loading of the vehicle. This can be carried out continuously or only when a permissible loading limit is exceeded.

BRIEF DESCRIPTION OF THE DRAWINGS

The invention will be described in more detail below using a preferred exemplary embodiment and with reference to the appended drawings, in which.

DETAILED DESCRIPTION OF THE PREFERRED EMBODIMENTS

Figure 1:
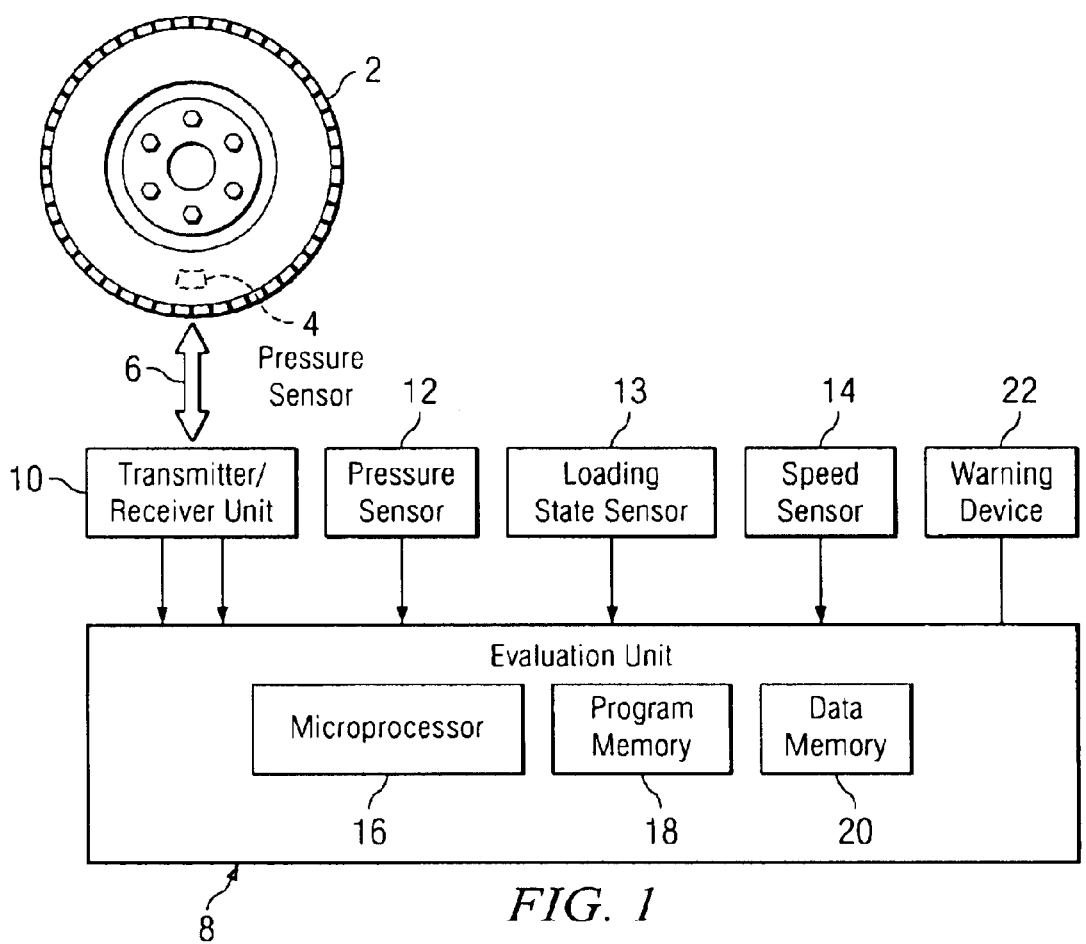
FIG. 1 shows a block diagram of a preferred exemplary embodiment of a system according to the invention.

As FIG. 1 shows, a pressure sensor 4 for registering the air pressure within the tire is arranged in a vehicle tire 2. The construction and mode of action of such a sensor are known per se and will therefore not be explained. The pressure sensor 4 does not necessarily have to be arranged in the interior of the tire; it can also be arranged on a valve, so that the pressure-sensitive element of the pressure sensor 4 registers the internal pressure in the tire. The output signal from the pressure sensor 4 is transmitted to an evaluation unit 8 via a radio transmission link 6. However, depending on the construction and arrangement of the sensor, this can also be done mechanically via wiping contacts or, as in accordance with the preferred system, wire-free in a manner known per se, for example by means of a transponder which communicates with a transmitter/receiver unit 10 which conditions signals transmitted via the transponder and supplies them to inputs of the evaluation unit 8. Connected to further inputs of the evaluation unit 8 are an ambient air pressure sensor 12, a vehicle loading state sensor 13 and a speed sensor 14.

The evaluation unit 8 contains, in a manner known per se, a microprocessor 16 having a program memory 18 and a data memory 20. One output of the evaluation unit 8 is connected to a warning device 22, for example a warning lamp or a display in a vehicle switch panel with, if appropriate, an additional acoustic indicator.

A functional example of the unit described will be explained using the flow chart according to FIG. 2.

Following the activation of the method in step S1, according to the preferred exemplary embodiment, a permanently predefined vehicle-specific air pressure $\rho_{nom}$ is determined. This can be stored, for example, in a memory known per se. Furthermore, in step S2 a parameter K1 is determined which depends on a measured ambient air pressure $\rho_{air,\ momentary}$. This measured ambient air pressure can, for example, be placed in a relationship with a nominal air pressure $\rho_{air,\ nom}$ (for example 1024 mbar), so that for the parameter K1 it is true that $K1 = \rho_{air,\ momentary} - \rho_{air,\ nom}$.

Likewise, in step S2, a further parameter K2 is determined which according to the preferred exemplary embodiment, depends on the vehicle speed. In step S2, a third parameter K3 is also determined, which depends on the vehicle loading. Likewise, in step S2 according to the preferred exemplary embodiment, a fourth parameter K4 is determined, which takes into account a tire inflation pressure read off from an external tire inflation instrument during inflation of the tire to be monitored.

The abovementioned parameter K4 is used, for example, to take account of the fact that the driver of a vehicle provides the tire from the start with an air pressure which, for example, is 0.2 bar above the tire air pressure recommended by the manufacturer.

Of course, fewer or else more parameters which can influence the optimum tire air pressure can also be taken into account.

A current tire air pressure, likewise determined in step S2, is then compared with, for example, permanently predefined threshold values in step S3. If these threshold values are violated, then the driver of the vehicle is warned immediately in step S4. These permanently predefined threshold values are used to warn the driver in good time in the event of a sudden tire air pressure drop.

If, in step S3, the permanently predefined threshold values are not violated by the tire air pressure currently measured in step S2, then the instantaneous optimum tire air pressure is calculated in step S5. According to the preferred exemplary embodiment of the invention, this is carried out by using the following formula:

$$\rho_{opt} = \rho_{nom} + K1 + K2 + K3 + K4$$

In step S6, a tolerance band is then calculated, the optimum tire air pressure determined in step S5 lying within the tolerance band. According to the preferred exemplary embodiment, the upper and the lower limits of the tolerance band are permanently predefined. Alternatively, however, the upper and lower limit of the tolerance band could also depend on one or more of the abovementioned parameters that influence the tire air pressure.

In step S7, a check is made as to whether the currently determined tire air pressure lies within the tolerance band. If this is so, then in step S8 an internal counter is reduced by a predetermined value. According to the preferred exemplary embodiment of the method, this predetermined value is permanently predefined and always the same. Alternatively, however, it is also possible to reduce the counter appropriately on the basis of the distance of the current tire air pressure from the upper and/or the lower limit of the tolerance band. The method is then continued with step S2.

If the currently determined tire air pressure does not lie within the tolerance band, then the counter is increased in step S9. According to the preferred exemplary embodiment, the value by which the counter is increased in step S9 is variable. In order to determine the value by which the counter is to be increased, the distance $\Delta p$ of the current tire air pressure from the tolerance band is determined in step S10. In step S11, on the basis of the distance $\Delta p$ calculated in step S10, a counter incremental value $\Delta L$ is then calculated, $\Delta L = f(\Delta p)$. In step S12, a corresponding counter increment determined in step 11 is then made.

Figure 2:
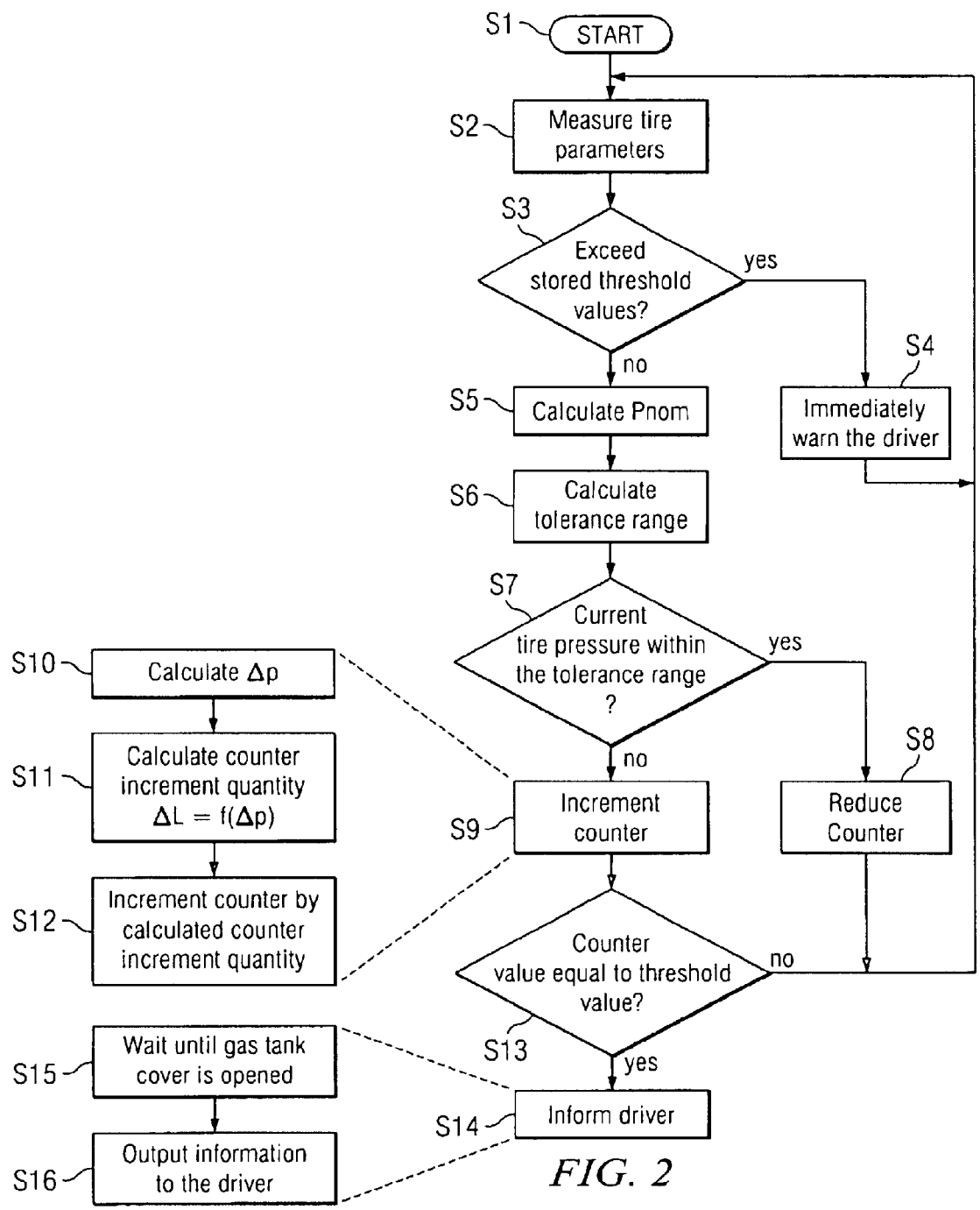
FIG. 2 shows a flow chart to explain the functioning of the system according to the invention or the method according to the invention.

The value of the counter reached on the basis of the counter increment carried out in step S12 is then compared with a fixed or variable threshold value in accordance with the preferred exemplary embodiment of the method, see step S13 in FIG. 2. If the predetermined threshold value is not reached in step S13, the method according to the invention is continued with the aforementioned steps at step S2. On the other hand, if the threshold value is reached, the driver is informed appropriately in step S14.

According to the preferred exemplary embodiment, the driver is not informed immediately but, in step S15, the information is held back until the gas-tank cover is opened or until it is detected that the vehicle tank is being filled. Only then, in step S16, is the information already present at step 14 output to the driver, and the driver is, for example, informed about a pressure drop in a tire.

Alternatively, it is possible for the driver to be informed about a pressure drop in a tire when starting the vehicle. It may be possible for this information to be called up at any time, for example also via pressure on a knob.

What is claimed is:

1. A method, comprising:
   measuring at least one parameter that influences tire pressure;
   calculating a tolerance pressure range about an optimum tire pressure based upon the at least measured parameter;
   measuring the tire pressure;
   comparing the measured tire pressure with the tolerance pressure range;
   incrementing a counter when the measured tire pressure falls outside of the tolerance pressure range;
   decrementing the counter when the measured tire pressure falls within the tolerance pressure range; and
   generating an alarm signal when the counter exceeds a predetermined threshold value.

2. A method as in claim 1, wherein the optimum tire pressure includes a vehicle-specific parameter.

3. A method as in claim 1, wherein the at least one para-meter changes as a function of ambient air pressure.

4. A method as in claim 1, wherein the at least one parameter changes as a function of vehicle speed.

5. A method as in claim 1, wherein the at least one para-meter changes as a function of vehicle loading.

6. A method as in claim 1, wherein the at least one para-meter changes as a function of tire inflation.

7. A method as in claim 1, wherein the at least one para-meter is selected from the group consisting of ambient air pressure, vehicle speed, vehicle loading and tire inflation.

8. A method as in claim 1, further comprising:
outputting the generated alarm signal when a vehicle gas tank cover is opened.

9. A method as in claim 1, further comprising:
outputting the generated alarm signal when a vehicle comprising the tire is being serviced.

10. A method as in claim 1, further comprising:
calculating a still permissible vehicle loading based upon a predetermined value and the measured tire pressure; and
displaying the still permissible vehicle loading.

11. A method as in claim 10, wherein the predetermined value is the calculated optimum tire pressure.

12. A method as in claim 1, wherein the counter incrementing step further comprises:
calculating a counter increment quantity based upon the amount that the measured tire pressure falls outside of the tolerance pressure range; and
incrementing the counter by the calculated counter increment quantity.

13. An apparatus, comprising:
at least one tire;
at least one sensor arranged and constructed to measure at least one parameter relating to the at least one tire, which at least one parameter influences tire pressure, the at least one sensor being arranged and constructed to generate at least one parameter signal based upon the at least one measured parameter;
an air pressure sensor arranged and constructed sure tire pressure and generate a tire pressure based upon the measured tire pressure; and
an evaluation unit arranged and constructed to calculate a tolerance pressure range about an optimum tire pressure that is based upon the at least one parameter signal;
compare the tire pressure signal with the tolerance pressure range;
increment a counter when the tire pressure signal calls outside the tolerance pressure range;
decrement the counter when the tire pressure signal falls within the tolerance pressure range; and
generate an alarm signal when the counter exceeds a pre determined threshold value.

14. An apparatus as in claim 13, wherein the at least one parameter is selected from the group consisting of a vehicle-specific parameter, ambient air pressure, vehicle speed, vehicle loading, and tire inflation.

15. An apparatus as in claim 14, further comprising a sensor arranged and constructed to detect when a vehicle gas tank cover is opened, wherein the evaluation unit only generates the alarm signal upon detection by the sensor of the opening of the vehicle gas tank cover.

16. An apparatus as in claim 13, wherein the evaluation unit is further arranged and constructed to:
calculate a counter increment quantity based upon the a mount that the tire pressure signal falls outside of the tolerance pressure range; and
increment the counter by the calculated counter increment quantity.

17. A computer program embodied in a computer memory means comprising instructions for:
calculating a tolerance pressure range about an optimum tire pressure based upon at least one measured tire parameter,
comparing the tolerance pressure range with a signal representative of a measured tire pressure;
incrementing a counter when the measured tire pressure signal falls outside the tolerance pressure range;
decrementing the counter when the measured tire pressure signal falls within the tolerance pressure range; and
generating an alarm signal when the counter exceeds a predetermined threshold value.

18. A computer program as in claim 17, wherein the at least one measured tire parameter is selected from the group consisting of a vehicle-specific parameter, ambient air pressure, vehicle speed, vehicle loading, and tire inflation.

19. A computer program as in claim 17, further comprising an instruction for:
outputting the generated alarm signal upon receiving a signal indicating detection of the opening of a vehicle gas tank cover.

20. A computer program as in claim 17, wherein the counter incrementing instruction comprises:
calculating a counter increment quantity based upon the amount that the measured tire pressure signal falls out side of the tolerance pressure range; and
incrementing the counter by the calculated counter increment quantity.

* * * * *